April 7, 1970 F. C. ALPERS 3,505,467

TELEVISION FRAME RATE REDUCTION SYSTEM

Filed July 6, 1965 3 Sheets-Sheet 1

FREDERICK C. ALPERS
*INVENTOR.*

BY *H. M. Phillips*
*J. M. St. Amand*
*ATTORNEY*

April 7, 1970 F. C. ALPERS 3,505,467

TELEVISION FRAME RATE REDUCTION SYSTEM

Filed July 6, 1965 3 Sheets-Sheet 2

FREDERICK C. ALPERS
INVENTOR.

BY [signatures]

ATTORNEY

FREDERICK C. ALPERS
INVENTOR.
BY
ATTORNEYS

United States Patent Office 3,505,467
Patented Apr. 7, 1970

3,505,467

TELEVISION FRAME RATE REDUCTION SYSTEM

Frederick C. Alpers, Riverside, Calif., assignor to the United States of America as represented by the Secretary of the Navy Filed July 6, 1965, Ser. No. 469,953
Int. Cl. H04n 3/16
U.S. Cl. 178—6.8 3 Claims

ABSTRACT OF THE DISCLOSURE

A television frame rate reduction system employing a technique of dividing a normal television raster into a number of vertical sections and transmitting information for one of these sections during each full frame scan by the camera system.

The invention herein described may be manufactured and used by or for the Government of the United States of America for governmental purposes without the payment of any royalties thereon or therefor.

The present invention relates to a television frame reduction system and more particularly to a television frame reduction system wherein the video information from each horizontal (or vertical) scanning line is transmitted in a segment-by-segment manner.

The usual means of reducing the frame rate is to use a scan converter which is complicated and bulky in that it requires one or more storage tubes, together with slow scan, read out, and storage erasing circuitry to provide the desired television information at a slower rate than that at which it is fed in.

The present invention provides a television rate reduction system employing a technique of dividing a normal television raster into a number of vertical sections and transmitting information for one of these sections during each full frame scan by a camera system. Accordingly, an object of the invention is to provide a simplified frame rate reduction system.

Another object of the invention is the provision of a frame reduction system which eliminates the complicated and bulky components of known systems.

A third object of the invention is the provision of a frame rate reduction system in which motion of the camera at moderate rates or corresponding motion of objects within the scene televised do not result in blurring or loss of definition in the low-frame-rate television reproduction of the scene.

Other objects and many of the attendant advantages of this invention will become readily appreciated as the same becomes better understood by reference to the following detailed description when considered in connection with the accompanying drawings wherein.

Figure 1:
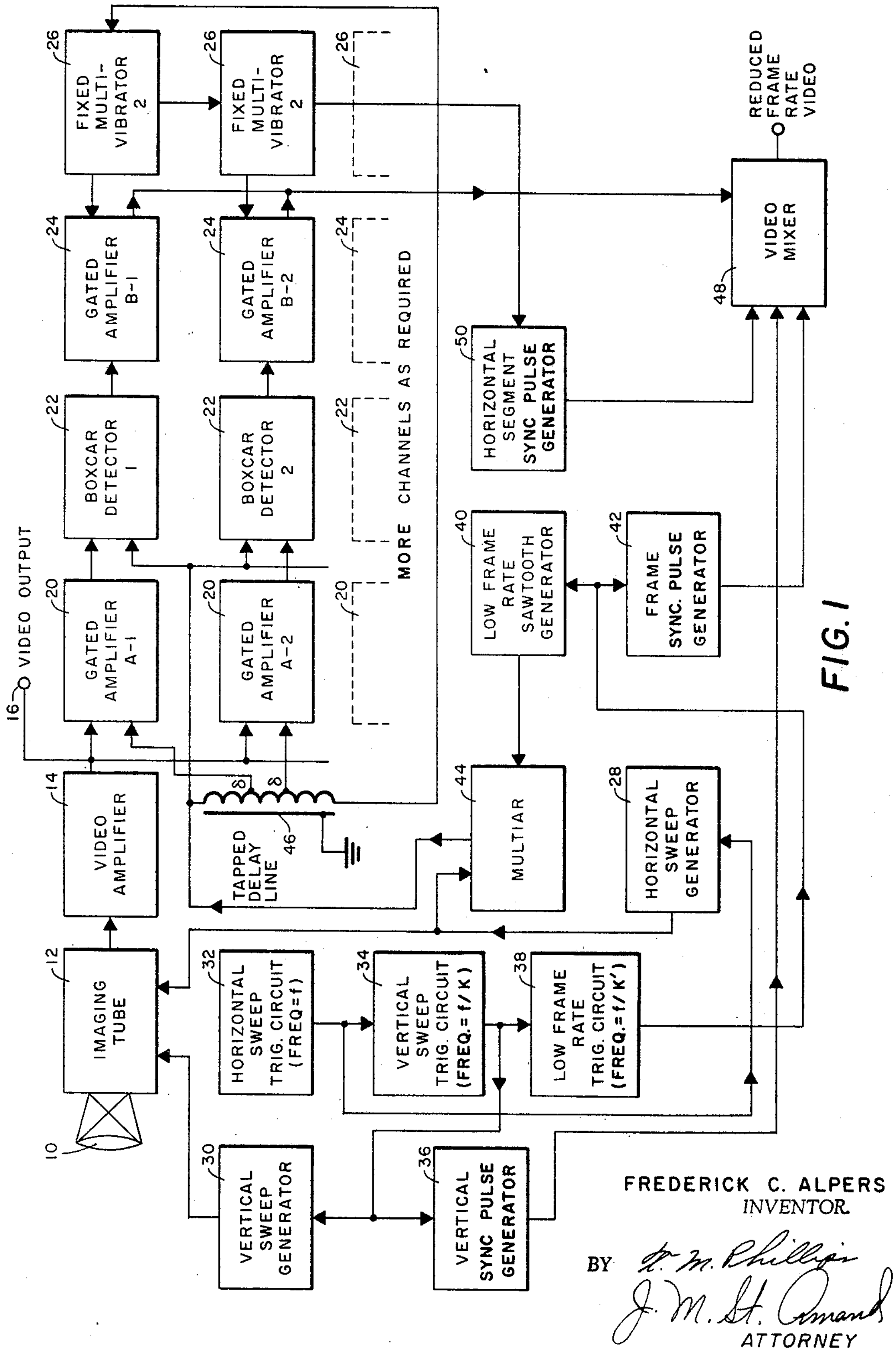
FIG. 1 is a block diagram of a preferred embodiment of the invention.

Referring now to FIG. 1 there is shown a lens 10 for viewing a target (not shown) and focusing an image of the target on the faceplate of an imaging tube 12. The video output signal is amplified in video amplifier 14 and fed to video output terminal 16. The output of video amplifier 14 is also fed to a plurality of video channels (only two are shown), each comprising a gated amplifier 20, boxcar detector 22, gated amplifier 24 and fixed multivibrator 26.

Horizontal and vertical sweep voltages for imaging tube 12 are provided, respectively, by horizontal and vertical sweep generators 28 and 30. Horizontal sweep generator 28 is triggered by horizontal sweep trigger circuit 32 while vertical sweep generator 30 is triggered by vertical sweep trigger circuit 34. Vertical sweep trigger circuit 34 also provides signals to vertical synchronization coder or pulse generator 36 and low frame rate trigger circuit 38. Low frame rate trigger circuit 38 supplies trigger signals to low frame rate sawtooth generator 40 and frame synchronization coder or pulse generator 42. The outputs of low frame rate sawtooth generator 40 and horizontal sweep generator 28 are compared in multiar 44 which feeds a signal through delay line 46 to gated amplifiers 20 and directly to boxcar detectors 22. Video information is coupled from gated amplifiers 24 to video mixer 48 which has three synchronization pulses fed from vertical synchronization coder 36, frame synchronization coder 42 and horizontal segment synchronization coder 50. The output signal from video mixer 48 is the reduced frame rate video.

Figure 2:
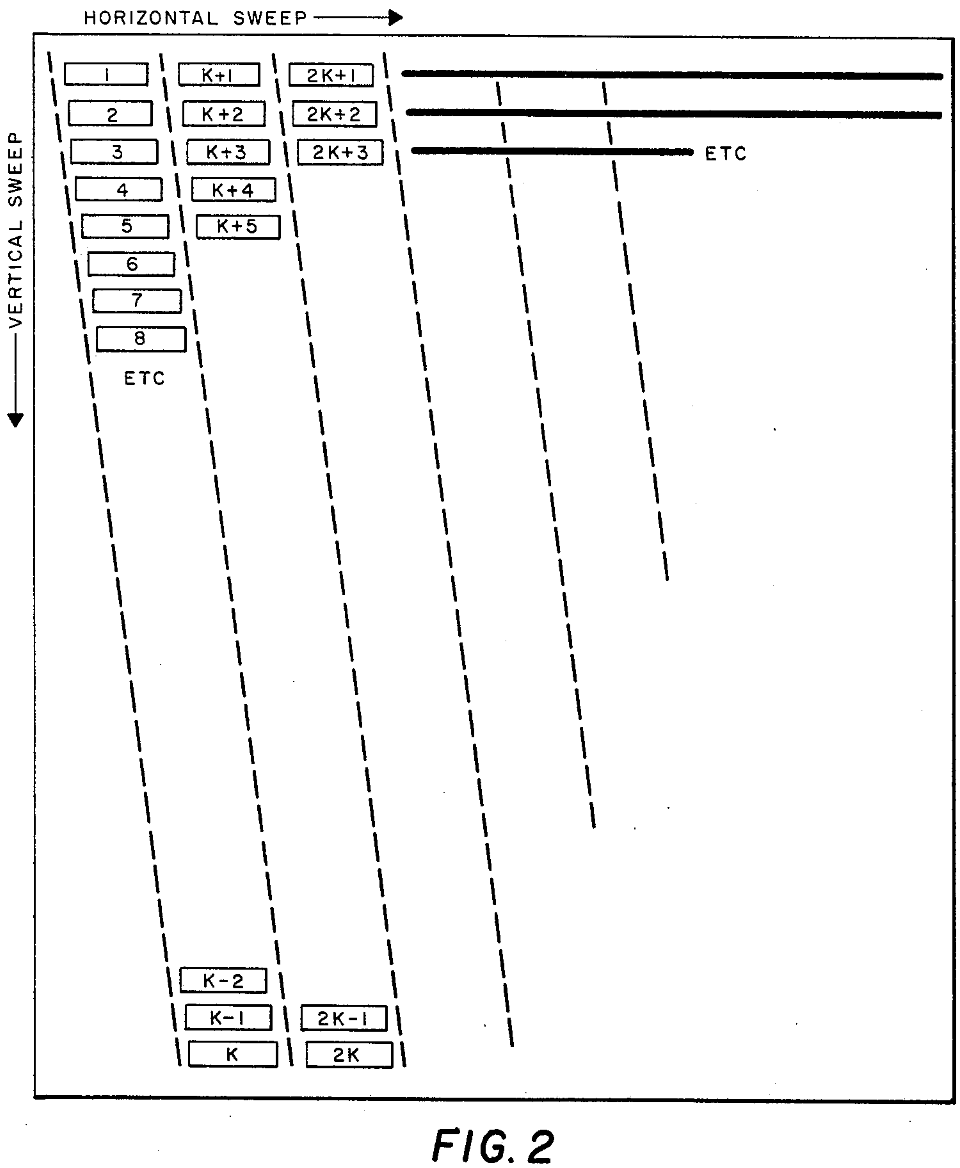
FIG. 2 is a diagram showing principle involved in describing the invention.

Referring to FIG. 2, there is shown the normal television raster divided into a number of vertical sections.

For a given fast-scan system, the number of bits of information in each slow-scan horizontal line-segment is determined by the number of vertical sections into which the raster is divided; and the number of vertical sections is in turn determined by the specific slow-scan rate selected. For example, if the fast-scan system is operating at 60 frames/sec., and if the desired slow-scan rate is one frame every 2 sec., the raster must be divided into 120 sections to permit the slow-scan system to provide complete coverage of a single frame in the 2-sec. period. If each complete horizontal line consists of 360 discernible bits of information, each slow-scan segment will consist of 3 bits of information (360 bits/120 sections). If each bit of information is read off in a single channel and each of the channels is sampled during the course of each fast horizontal line-scan, the segment-scanning system need employ only three channels of information.

Triggering circuits 32, 34 and 38 are synchronized with one another: horizontal sweep triggering circuit 32 operates at a frequency $f$; vertical sweep triggering circuit 34 is set to trigger at some subharmonic or countdown from frequency, $f$ ($f/K$); and low-frame-rate triggering circuit 38 is set to trigger at a further countdown from the vertical sweep triggering frequency ($f/K$), to provide the particular low frame rate desired. In the example provided, it would be a countdown of 120 to provide one cycle every two seconds.

Low-frame-rate triggering circuit 38 triggers sawtooth generator 40 which functions very much in the manner of a vertical sweep generator except that it is reduced in speed by the same factor as the triggering circuits are reduced; i.e., the sawtooth rises at a rate approximately $1/120$ of the rate of the vertical sweep in the example cited. The outputs of low-frame-rate sawtooth generator 40 and horizontal sweep generator 28 are compared in a multiar circuit 44, which gives an output pulse whenever the voltage of horizontal sweep generator 28 coincides with that of sawtooth generator 40. Multiar 44 selects a particular segment of an overall horizontal sweep that is to be transmitted and utilized for building up the low-frame-rate picture while the full horizontal sweep of the fast-scan is in progress. Multiar 44 is designed so that its output pulse equals in duration a certain pulse width ($\delta$) which represents the time required by the horizontal sweep of imaging tube 12 to scan across a given resolution element or a bit of information within the segment of sweep. In the example provided, the time required to sweep the complete segment is $3\delta$, and $\delta = 1/[360$ bits per line $\times k$ lines per frame $\times 60$ frames per second], which turns out to be 0.2 μsec. when $k=230$.

Each of the channels for processing individual bits of information consists of a gated amplifier 20, a boxcar detector 22, a second gated amplifier 24, and a fixed multivibrator 26. As indicated above, the number of channels is determined by the number of information bits in each segment, and this in turn depends on the low frame rate desired. If an increase in the low frame rate were desired (e.g., from one frame every two seconds to one frame every second), the number of channels would be increased to accommodate the increased number of information bits in each segment; if a reduction were desired (e.g., from one frame every two seconds to one frame every three seconds), the number of channels could be reduced down to the point where only one channel remained, which in the case considered here would occur with one frame every six seconds. If an even greater reduction were desired, the output from multiar 44 could be passed through a counter, and the further reduction achieved simply by skipping horizontal lines between which the one single bit of information would be sampled.

The operational sequence in channel one begins when a pulse from multiar 44 reaches boxcar detector one, where it discharges any previous signal so that it will be ready to receive new information. After the multiar pulse, with its width of $\delta$, has disappeared in boxcar detector, it appears via delay line 46 at gated amplifier A–1, thus gating it into action immediately after boxcar one has been cleared of all other signals. One bit of video information coming from video amplifier 16 is selected in gated amplifier A–1 and is passed on to boxcar detector one, where the amplitude of this particular bit is stored. From boxcar detector one it passes on to gated amplifier B–1, but can go no further until a gate is received from fixed multivibrator one which switches "on" the output of gated amplifier B–1 and causes the signal to be fed into a common channel leading down to video mixer 48.

With the particular timing arrangement described (which could be replaced by other timing arrangements), fixed multivibrator one is triggered "on" to supply a gate to amplifier B–1 after the pulse from multiar 44 has passed completely through tapped delay line 46 so that each of the boxcar detectors has been renewed with fresh signal and all of the gated amplifiers designated B are ready to supply a signal out to video mixer 48. Fixed multivibrator one is gated "on" for a period equal to $1/(n+1)f$, where $n$ is the number of bits of information contained in each segment (3, in the example given), and $f$ is again the frequency of horizontal sweep circuit 32. This particular timing sequence allows multivibrators 26 to produce gates sequentially during the course of the horizontal scanning action of imaging tube 16 before another multiar pulse occurs, and still allows an equal segment of time for introduction of a synchronization signal to be used in triggering the indicator circuits at the remote point where the reduced-frame-rate picture is to be reconstructed. In a three-channel system, fixed multivibrator one would operate for one-fourth the duration of the horizontal sweep.

For the entire time during which fixed multivibrator one is operating, the information concerning the one bit of video which was selected in channel one is supplied to video mixer 48 by gated amplifier B–1. In a similar manner, the second bit of information is selected in gated amplifier A–2 (by reason of its being gated "on" after an additional $\delta$ delay from the time when gated amplifier A–1 was gated "on"), and this second bit of information is transmitted to video mixer 48, following that from channel one, when fixed multivibrator two supplies the proper gating signal. Fxed multivibrator two is triggered "on" by the decay of the "on" gate from multivibrator one, and the desired sequencing of the information fed to video mixer 48 is achieved. Similarly, the third bit of information comes through channel three still later, and further bits follow from any additional channels which might be used.

The three synchronization coders 36, 42, and 50 provide the synchronization required for reconstruction of the picture at the point of reception, which is normally a very remote point. Horizontal synchronization coding action, provided by synchronization coder 50, is required to provide a readily identified synchronization pulse to signify when each new segment of information is being supplied. In the reconstruction of the picture, this pulse is used to trigger a short, slow horizontal sweep, during which the bits of information are presented for a given short portion of the total horizontal-display dimension. Immediately thereafter, the arrival of the next horizontal segment synchronization pulse drops the writing trace down to the line below, where it begins a second segment in the same manner in which the segments were sequentially selected, as described above. Vertical synchronization coder 36 supplies a pulse which is used in a conventional manner for running the vertical sweep when the picture is reconstructed. Frame synchronization coder 42 provides a pulse which indicates completion of a complete low-frame-rate frame, and signifies that the picture-reconstruction action is to revert to a new slow-scan sequence beginning at the left-hand side of the picture.

Figure 3:
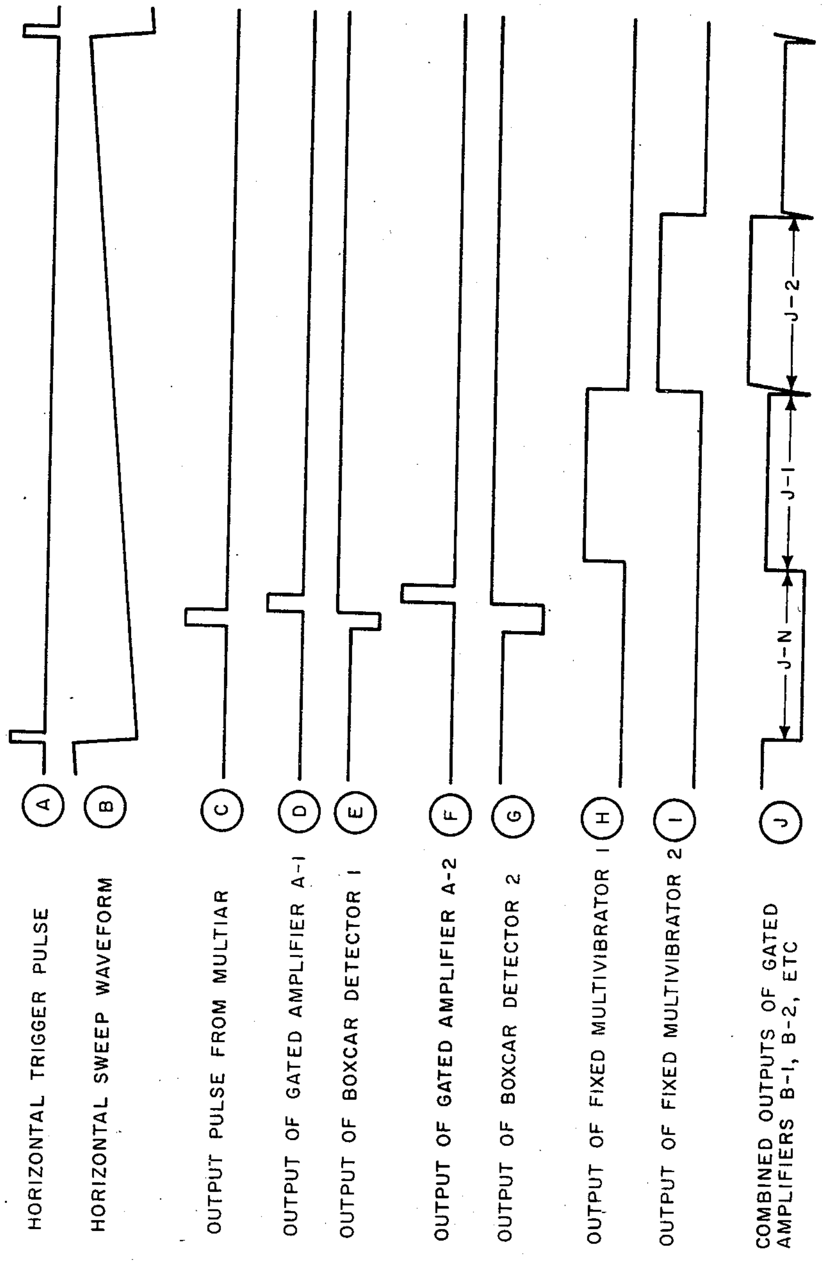
FIG. 3 is a graph of waveforms used in describing the operation of the system of FIG. 1.

FIGURE 3 shows some of the waveforms involved in the operation of the segment-transmitting system. The waveforms shown represent only a portion of one horizontal trace, since this is considered sufficient to provide an understanding of the entire action involved. Waveforms A and B represent, respectively, the horizontal sweep trigger and the horizontal sweep voltage, which are conventional and require no further explanation. Waveform C shows the output pulse from multiar 44 whose particular position along the horizontal sweep depends on the instantaneous voltage coming from low-frame-rate sawtooth generator 40. This voltage changes very slowly; as explained above, it causes a new and adjacent column of segments to be selected after each vertical scan.

Waveform D shows the output of gated amplifier A–1, which occurs later than the output of multiar 44 because of the first unit of delay $\delta$ introduced by tapped delay line 46. The amplitude of waveform D is determined by the video information which was present when gated amplifier A–1 was turned "on"; i.e., the amplitude of this pulse represents the desired information concerning the one bit of video that is now being processed. However, the pulse must be stretched out in duration by subsequent circuitry before it is suitably reduced in bandwidth for transmission purposes. Waveform E shows the output of boxcar detector one, which is reduced to zero, or "erased," during the time of the multiar pulse, and then is set to the amplitude of the pulse arriving from gated amplifier A–1. It retains that amplitude for the rest of the cycle—i.e., until it is erased again. Waveform F shows the sampled output of gated amplifier A–2, and in this sense corresponds to waveform D, while waveform G shows the output of boxcar detector two.

Waveform H illustrates the timing of fixed multivibrator one. This turns "on" after all the boxcars have been loaded, and it continues for a fraction of the horizontal scan cycle, depending on the number of bits per segment and hence the number of channels involved. In the particular example previously considered, fixed multivibrator one would stay on for one-fourth of the total time available, thus allowing time for the operation of fixed multivibrators two and three, plus additional time for the horizontal segment synchronization coder 50 to supply its pulse or other coded information into the output. Waveform I similarly shows the timing of the action of fixed multivibrator two, which is turned "on" when fixed multivibrator one turns off, and has the same period as fixed multivibator one. Waveform J shows the video information fed to video mixer 48 from the combined outputs of gated amplifiers designated B. The portion of the waveform designated J–1 is that which arises from gated amplifier B–1, and in turn comes from boxcar detector one; the portion designated J–2 comes from gated amplifier B–2 and boxcar detector two; and so on. The portion designated J–N is the portion without bit information output which occurs when all of gated amplifiers are gated off; this is the time reserved for insertion of the pulse or code to indicate the start of a new horizontal segment.

What is claimed is:

1. In a television frame rate reduction system wherein a target scene is scanned at the normal television scan rate and the resulting video signal is made suitable at a lower scan rate, the combination comprising:

(a) electro-optical circuit means for scanning a target scene at the normal television scan rate and producing an output video signal, (b) a plurality of video channels each comprising (1) a first gated amplifier having a first input coupled to the output of said electro-optical circuit, a second input and an output, (2) a boxcar detector circuit having a first input coupled to the output of said gated amplifier and an output, (3) a second gated amplifier having a first coupled to the output of said boxcar detector circuit, a second input and an output, (4) a fixed multivibrator having an input, a first output coupled to the second input of said second gated amplifier and a second output, (c) circuit gating means coupled to the second input of said first gated amplifier in each of said video channels and to the input of said fixed multivibrator for successively gating open each channel to pass video signals, (d) circuit means coupled to the second output of said fixed multivibrator to combine the passed video signals into a slow scan representation of the originally scanned target scene.

2. The combination of claim 1 wherein said circuit gating means comprises:

(a) a horizontal sweep generator having an output for generating horizontal sweep voltages at the normal television scan rate, (b) a sawtooth waveform generator having an output for generating a sawtooth voltage at the desired low scan rate, (c) multiar circuit means having a first input coupled to the output of said horizontal sweep generator, a second input coupled to the output of said sawtooth generator and having an output coupled to said video channel.

3. The combination of claim 1 wherein said circuit gating means comprises:

(a) a horizontal sweep generator having an output for generating horizontal sweep voltages at the normal television scan rate, (b) a sawtooth waveform generator having an output for generating a sawtooth voltage at the desired low scan rate, (c) multiar circuit means having a first input coupled to the output of said horizontal sweep generator, a second input coupled to the output of said sawtooth generator and having an output coupled directly to the second input of each of said boxcar detector circuits and through a tapped delay line to the second input of each of said first gated amplifiers.

References Cited

UNITED STATES PATENTS 3,037,083 5/1962 Inouye ----------- 178—6.8 X

R. D. BENNETT, Primary Examiner

C. E. WANDS, Assistant Examiner